(12) United States Patent
Dallai et al.

(10) Patent No.: US 6,709,028 B2
(45) Date of Patent: Mar. 23, 2004

(54) QUICK COUPLING BALL-AND-SOCKET JOINT FOR PIPES

(75) Inventors: Fazio Dallai, Fabbrico (IT); Luca Lavagnini, Reggiolo (IT)

(73) Assignee: Dallai Ernesto Societa' a Responsabilita' Limitata, Reggio Emilia (IT)

( * ) Notice: Subject to any disclaimer, the term of this patent is extended or adjusted under 35 U.S.C. 154(b) by 0 days.

(21) Appl. No.: 10/173,113

(22) Filed: Jun. 18, 2002

(65) Prior Publication Data

US 2003/0116968 A1 Jun. 26, 2003

(30) Foreign Application Priority Data

Dec. 20, 2001 (IT) .................................... RE2001A0122

(51) Int. Cl.[7] ................................................. F16L 23/00
(52) U.S. Cl. ........................ 285/420; 285/261; 285/364; 285/406
(58) Field of Search ................................ 285/420, 261, 285/364, 406, 409, 268

(56) References Cited

U.S. PATENT DOCUMENTS

| | | | | | |
|---|---|---|---|---|---|
| 1,487,517 A | * | 3/1924 | Krause | ....................... | 285/261 |
| 2,098,188 A | * | 11/1937 | Kinmont | ..................... | 285/261 |
| 2,277,990 A | * | 3/1942 | Lanninger | ................... | 285/261 |
| 2,556,659 A | * | 6/1951 | Patterson | ..................... | 285/261 |
| 2,701,148 A | * | 2/1955 | Lanninger | ................ | 285/146.3 |
| 3,445,127 A | * | 5/1969 | Clake | ......................... | 285/420 |
| 3,494,641 A | * | 2/1970 | Caregnato | ................... | 285/364 |
| 3,997,197 A | * | 12/1976 | Marsh et al. | ............... | 285/420 |
| 4,223,922 A | * | 9/1980 | Pape | .......................... | 285/364 |
| 4,465,308 A | * | 8/1984 | Martini | ....................... | 285/261 |
| 5,873,609 A | * | 2/1999 | Abthoff et al. | ............. | 285/420 |

FOREIGN PATENT DOCUMENTS

FR         2595599    *    3/1986    ................. 285/420

* cited by examiner

*Primary Examiner*—David Bochna
(74) *Attorney, Agent, or Firm*—Browdy and Neimark

(57) ABSTRACT

Male and female components joined to respective pipes are coupled by an annular element (21) which embraces the male component and engages it in a transverse plane, and at least two coupling elements (30, 30') for hooking the female component, each having two parallel hooking arms (31) in the form of plates which lie in planes parallel to the axial plane (P) passing through the longitudinal center line of the coupling elements (30, 30'). Flanges (41) for the coupling elements are joined to the annular element (21) in planes parallel to the planes defined by the hooking arms (31), and these carry a transverse pin (42) for securing the hooking arms (31) in an axial direction. Axial traction applied to the coupling elements (30, 30') firmly join the male and female components together. The ball-and-socket joint obtained is able to better support high pressure.

6 Claims, 8 Drawing Sheets

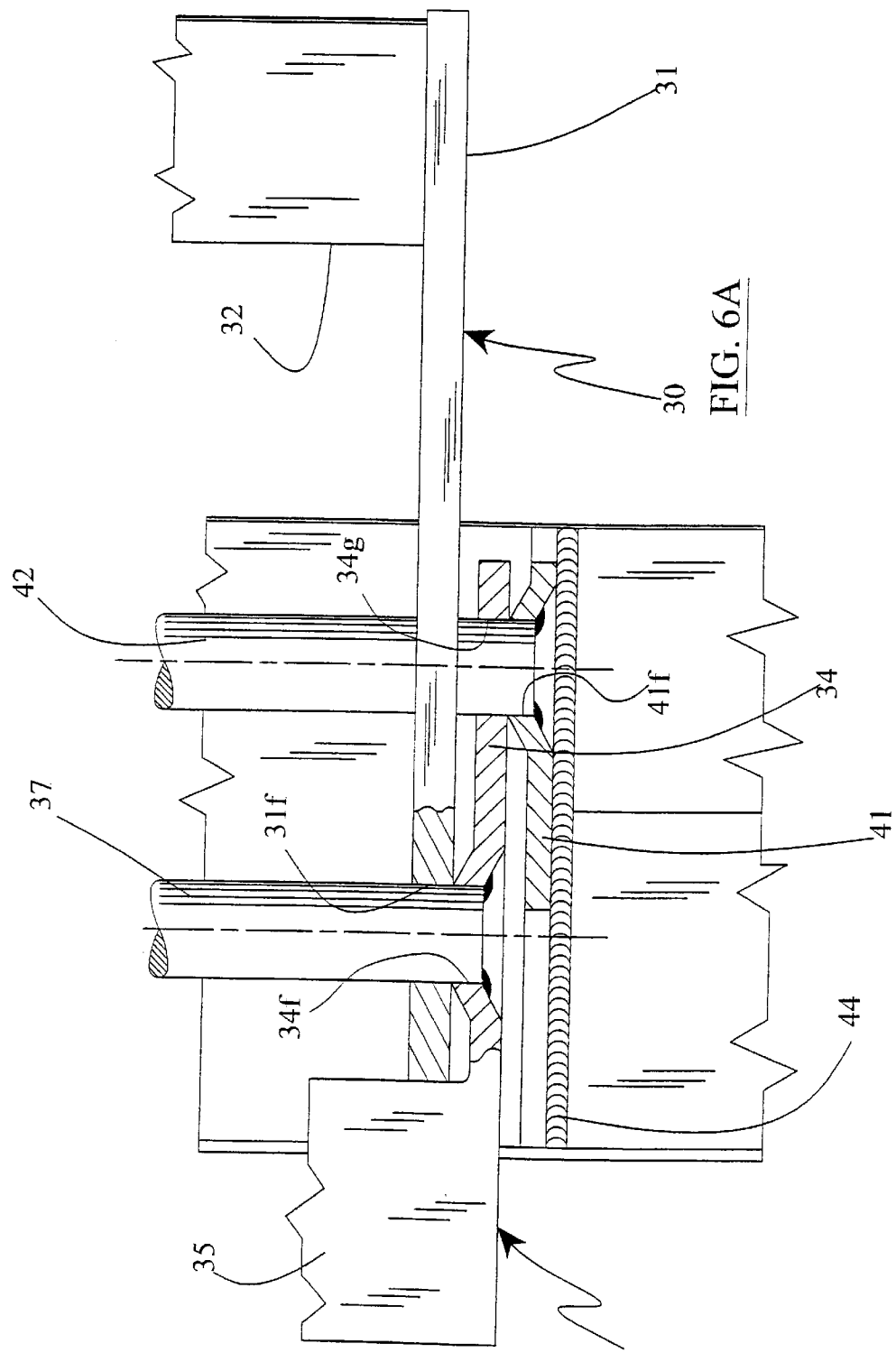

QUICK COUPLING BALL-AND-SOCKET JOINT FOR PIPES

This invention relates to an improved quick coupling ball-and-socket joint for pipes, in particular for pipes operating at higher than 5 atm pressure and of more than 100 mm diameter.

For connecting two pipes together, quick coupling ball-and-socket joints have been known for many years, comprising two components to be coupled together, namely a male component and a female component joined to the respective pipes, plus a third component for quickly coupling the first two components together.

The first two components are each in the shape of a bulging tube piece forming a segment of a spherical surface, and are coupled together in mutual contact with incident axes such as to enable a small angle to be formed between the axes of the two pipes.

Said third component, shown in frontal view in the accompanying FIG. 1 and FIG. 2, comprises an annular element 1N which embraces and engages the male component in a transverse plane, and at least two (usually only two) coupling means 2N and 2'N to be hooked to the female component Each coupling means 2N, 2'N comprises two parallel hooking arms 3N in the form of plates, lying in planes parallel to the axial plane P passing through the longitudinal centre line of the coupling means, and joined together by a transverse front plate 4N fixed to a first end of the arms 3N for its hooking to the female component.

The third component also comprises a pair of flanges 5N for each coupling means 2N, 2'N, in the form of plates fixed rigidly (by welding) to the annular element 1N and lying in planes parallel to the planes of the hooking arms 3N. Each of these pairs of flanges 5N carries a transverse pin 6N for securing the hooking arms 3N in the axial direction.

With at least one (usually only one) of the two coupling means, that indicated by 2N, there is associated a lever means 7N able to move the coupling means 2N in an axial direction to apply axial traction to the coupling means and hence firmly join the male and female components together. The lever means 7N comprises a pair of lever arms 8N in the form of plates lying in planes parallel to the planes of the flanges 5N and hinged at one end to the transverse pin 6N carried by the flanges 5N. The pair of lever arms 8N carries a second transverse pin 9N, parallel to and positioned at a distance from the first pin 6N, and on which the second ends of the hooking arms 3N of the coupling means 2N are hinged.

A characteristic which is of importance to the present invention is that the pair of flanges 5N in both the coupling means 2N and 2'N is positioned on the inside of the pair of hooking arms 3N. In this respect, in the coupling means 2N, both the hooking arms 3N and the lever arms 8N are positioned on the outside of the flanges 5N.

An object of this invention is to improve the described quick coupling ball-and-socket joint, and in particular its third component, in order to achieve a structure able to better support the pressure, especially if relatively high, to which the pipe is subjected.

This and further objects are attained by the invention as characterised in the claims.

The invention is based on the surprising observation that by applying said flanges of the coupling means on the outside of the outer faces of the longitudinal lever arms, considerable advantages are obtained in that the resultant structure is both less deformable and less tensioned than the corresponding traditional structure, with the practical consequence that the third component is able to work at considerably higher operating pressures for equal weight of the joint.

The invention is described in detail hereinafter with the aid of the following enclosed figures which illustrate a non-exclusive embodiment thereof.

FIG. 6A is an enlarged detail of FIG. 6.

Figure 4:
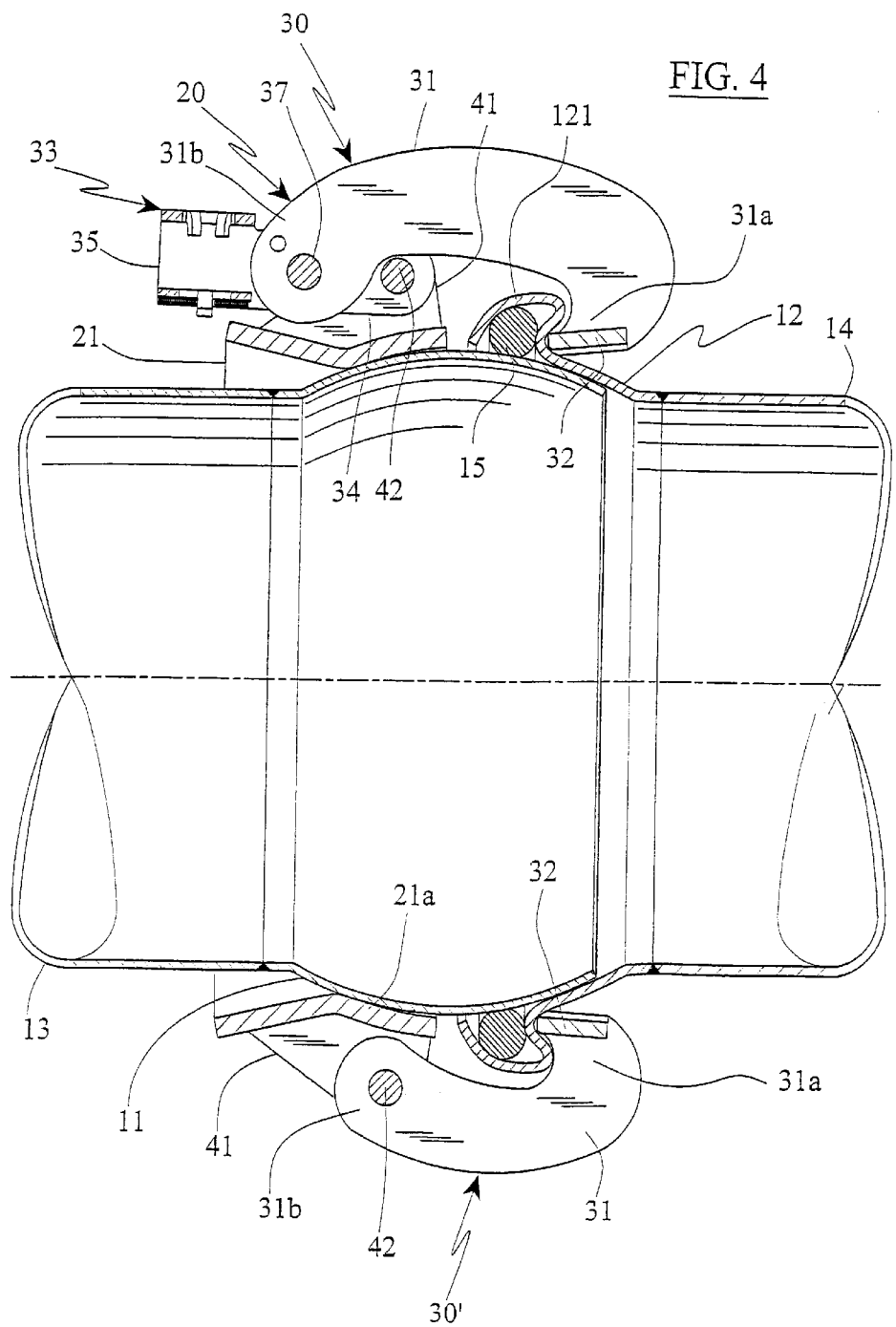
FIG. 4 is a section on the vertical axial plane of FIG. 3.
Figure 5:
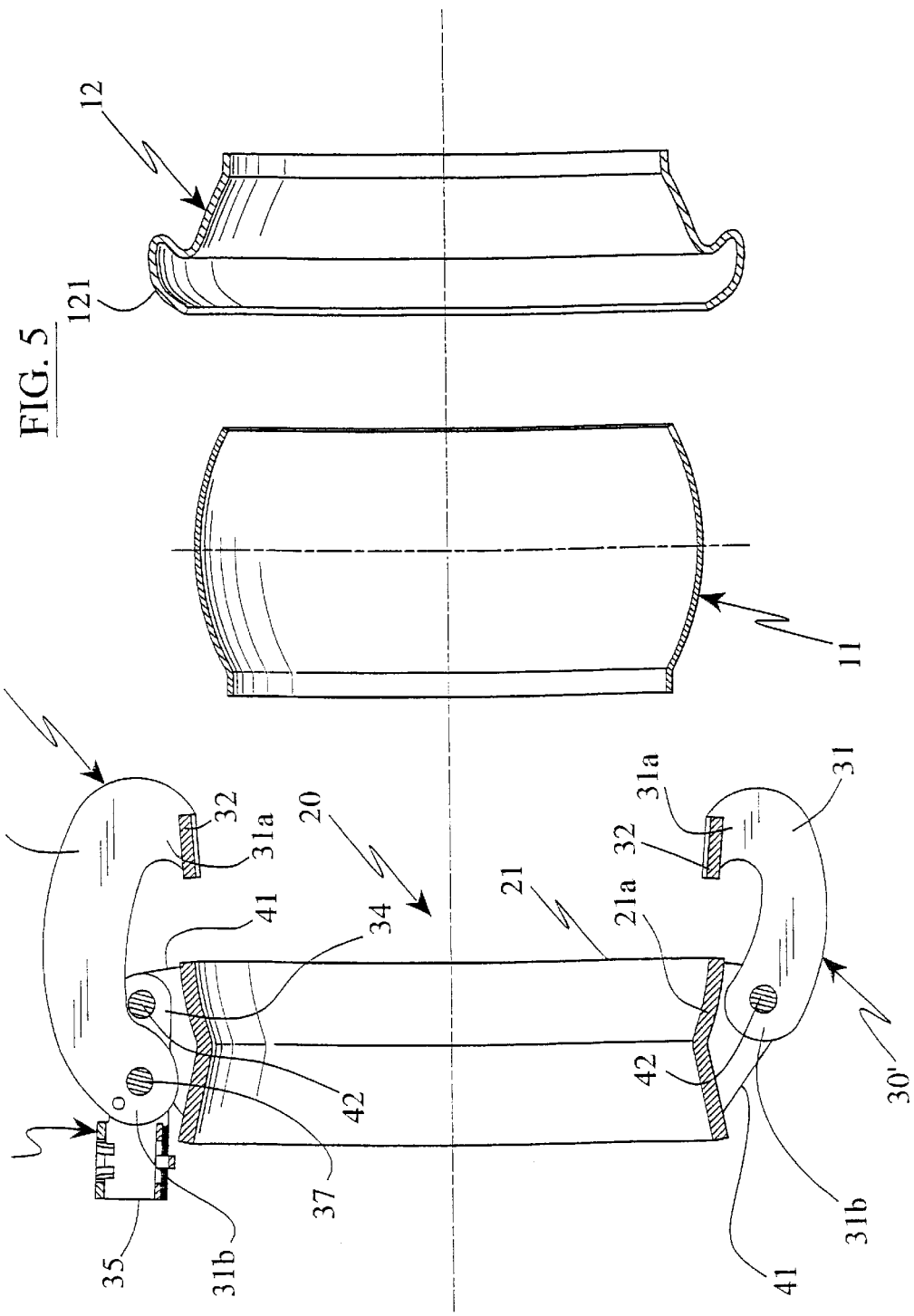
FIG. 5 is the same section as FIG. 4, but showing the three joint components separated.

The joint of the invention comprises, as in the case of a traditional joint, a male component 11 and a female component 12 butt-welded to respective pipes 13 and 14 and arranged to be partially inserted one into the other and coupled together (as shown in FIG. 4). The two components 11 and 12 are each in the shape of a bulging tube piece forming a spherical surface segment, and are coupled together in mutual contact with the facility to form a small angle between the axes of the two pipes 13 and 14. A gasket 15 can also be provided to make the seal between the male and female components hermetic.

A third component 20 is also provided for quickly coupling the first two components 11 and 12 together, and comprises an annular element 21, the cross-section of which possesses a portion 21a in the shape of an arc of radius of curvature virtually equal to that of the male component 11, to embrace and engage the male component along a band of contact extending in a transverse plane.

At least two (only two in the illustrated embodiment) coupling means 30 and 30' are applied to the annular element 21 for its coupling to the female component 12.

Each coupling means 30, 30' comprises two parallel hooking arms 31 in the form of a plate, which lie in planes parallel to the axial plane passing through the longitudinal centre line of the coupling means and are joined together by a transverse front plate 32 fixed to a first end of the arms 31, to engage the female component. Specifically, said arms 31 each have, in profile, a hook-shaped end 31a to which the transverse front plate 32 is welded.

The female component 12 possesses an edge 121 which is bent rearwards to achieve a coupling engagement with the front ends 31a and with the transverse plates 32 of the coupling means 30, 30'.

For each coupling means 30, 30' there is provided a pair of flanges 41 in the form of plates, which are joined firmly (by a weld 44) to the annular element 21 and lie in planes parallel to the planes defined by the hooking arms 31. Each of these pairs of flanges 41 carries a transverse pin 42 for axially restraining the hooking arms 31, which is inserted through suitable holes 41f and welded to the flanges 41.

With at least one (only one in the illustrated embodiment) of the two coupling means, that indicated by 30, there are associated means for applying axial traction to the coupling means 30 in order to securely join the male and female components together. For this there is provided a lever means 33 arranged to move the coupling means 30 in an axial direction and hence securely join the male component 11 and female component 12 together.

The lever means 33 comprises a pair of lever arms 34 in the form of plates lying in planes parallel to the planes of the flanges 41 an joined together by a transverse plate 35 to which a projecting handle 36 is connected., to be manually gripped and operated to operate the lever means.

The lever arms 34 are hinged, by holes 34g provided in their front end, to the transverse pin 42 carried by the flange 41.

The pair of lever arms 34 carries a second transverse pin 37 hinged through suitable holes 34f and welded to them. The pin 37 is parallel to the first pin 42 and positioned at a distance therefrom, and is hinged to the second end 31b of the hooking arms 31 by suitable exactly fitting holes 31f.

In the coupling means 30', that without the lever means, the second end 31b of the hooking arms 31 is hinged by holes 31h to the pin 42 carried by the flanges 41.

In use, after fitting the two components 11 and 12 together in known manner, the means 30 and 30' are hooked to the edge 121 of the component 12, after which the handle 36 is operated to pull the pair of arms 31 of the coupling means 30 rearwards, by which the female component 12 is pulled with force against the male component 11 to hence achieve a strong and secure connection.

According to the invention, the flanges 41 are on the outside of the outer faces of the hooking arms 31.

In the coupling means 30' where the hooking arms 31 are hinged directly on the transverse pin 42 carried by the flanges 41, the said arms 31 are positioned directly to the side of and in contact with the inner face of the flanges 41.

In the coupling means 30, where said lever means 33 is provided, the lever arms 34 are interposed between the corresponding hooking arms and the flanges, these elements being sandwiched in mutual contact.

Figure 1:
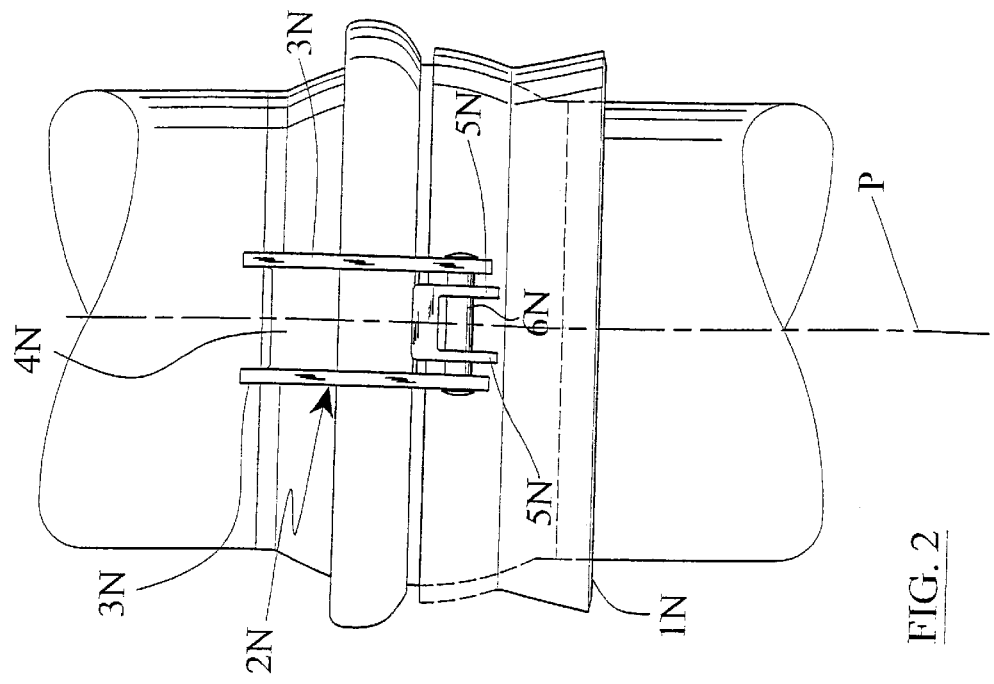
Figure 2:
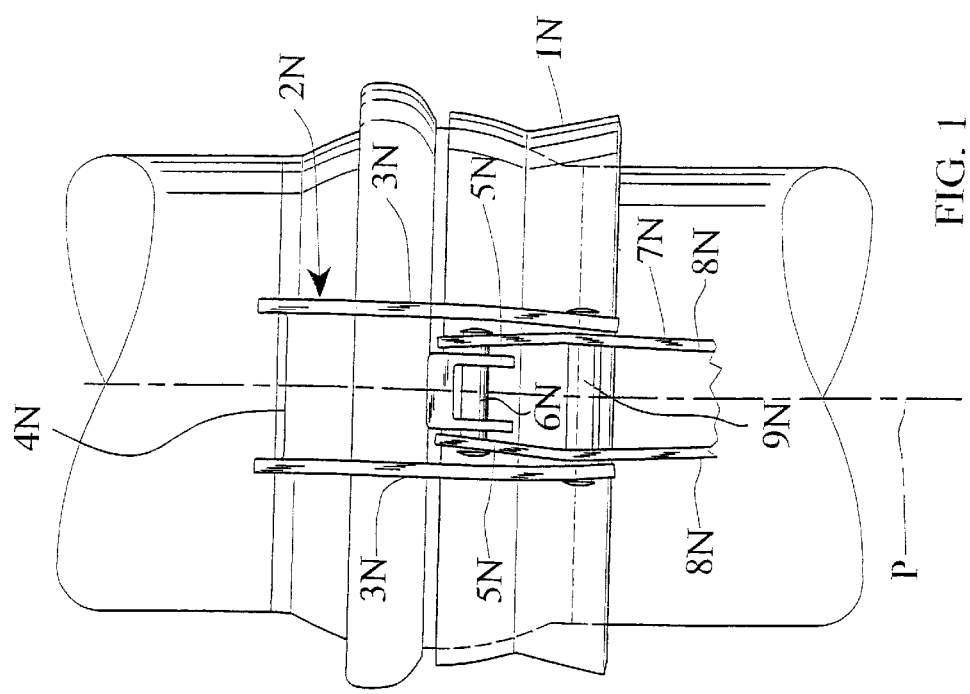
Figure 3:
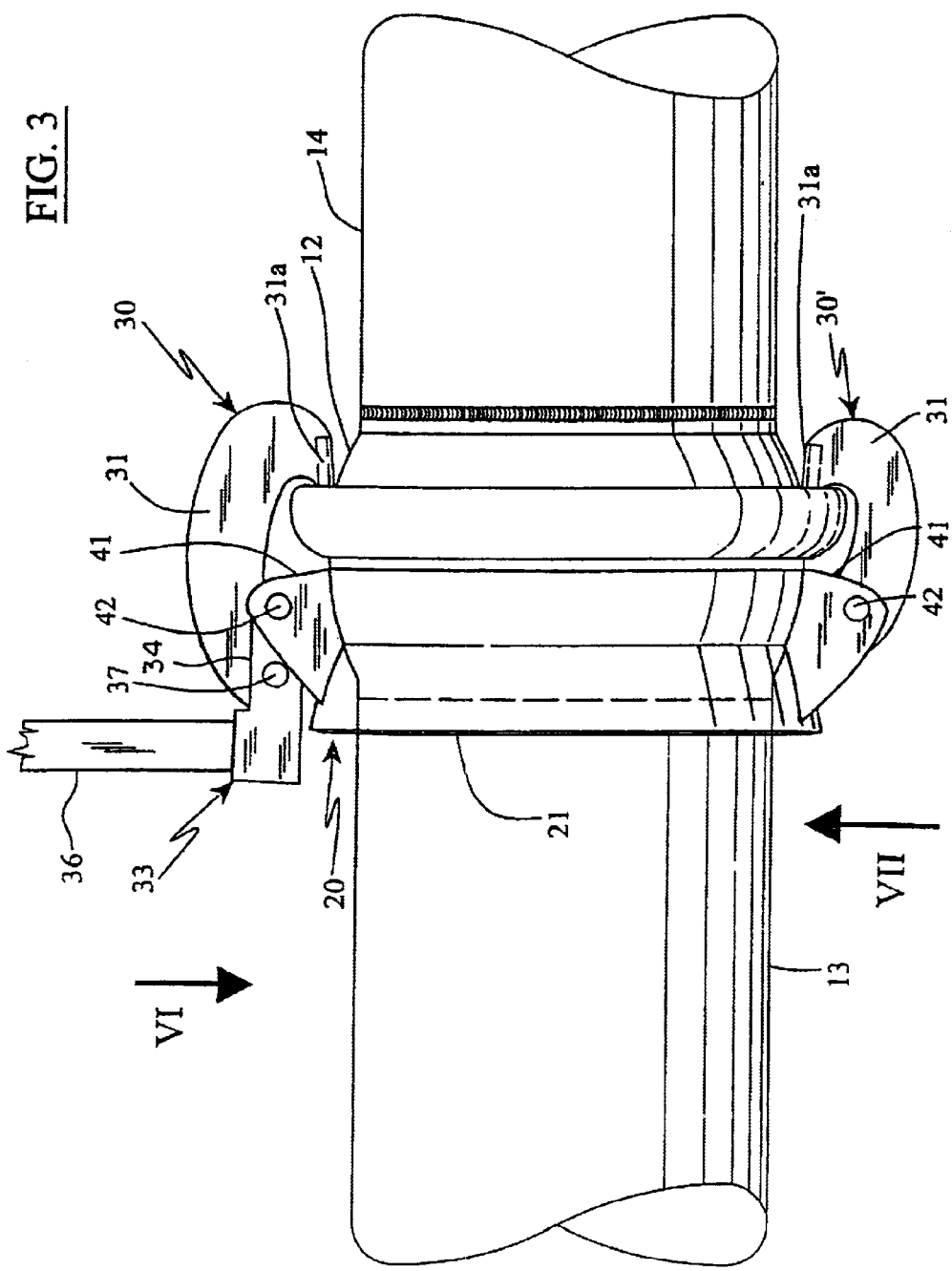
FIG. 3 is a side view of the joint of the invention.

By virtue of the described characteristics it has been found that, compared with a traditional joint of the same weight such as that shown in FIGS. 1 and 2, the joint of the invention is able to withstand operating pressures higher by an average of 15–20%.

A possible explanation is that, according to the invention, as the width of the coupling means 30, 30' is maintained nearly constant compared with the traditional means, in each of these coupling means the flanges 41 are disposed at a greater distance apart, being positioned on the outside of the coupling means; hence there is a better distribution of the forces to which the annular element 21, the most stressed element, is subjected. Even though the transverse pins 42 and 37 and the transverse plate 35 of the lever means 33 are longer than in traditional joints, the annular element 21 can be made of smaller cross-section because of the better force distribution.

It should be again noted that the final result is that, for equal weights, a joint is obtained able to operate at higher pressures, or alternatively a joint which for the same pressure is lighter and consequently of more economical construction and easier to manipulate; in this latter respect it should be noted that, in the case of large pressures and diameters, traditional joints can be of considerable weight, and hence a weight reduction is very desirable.

Figure 7:
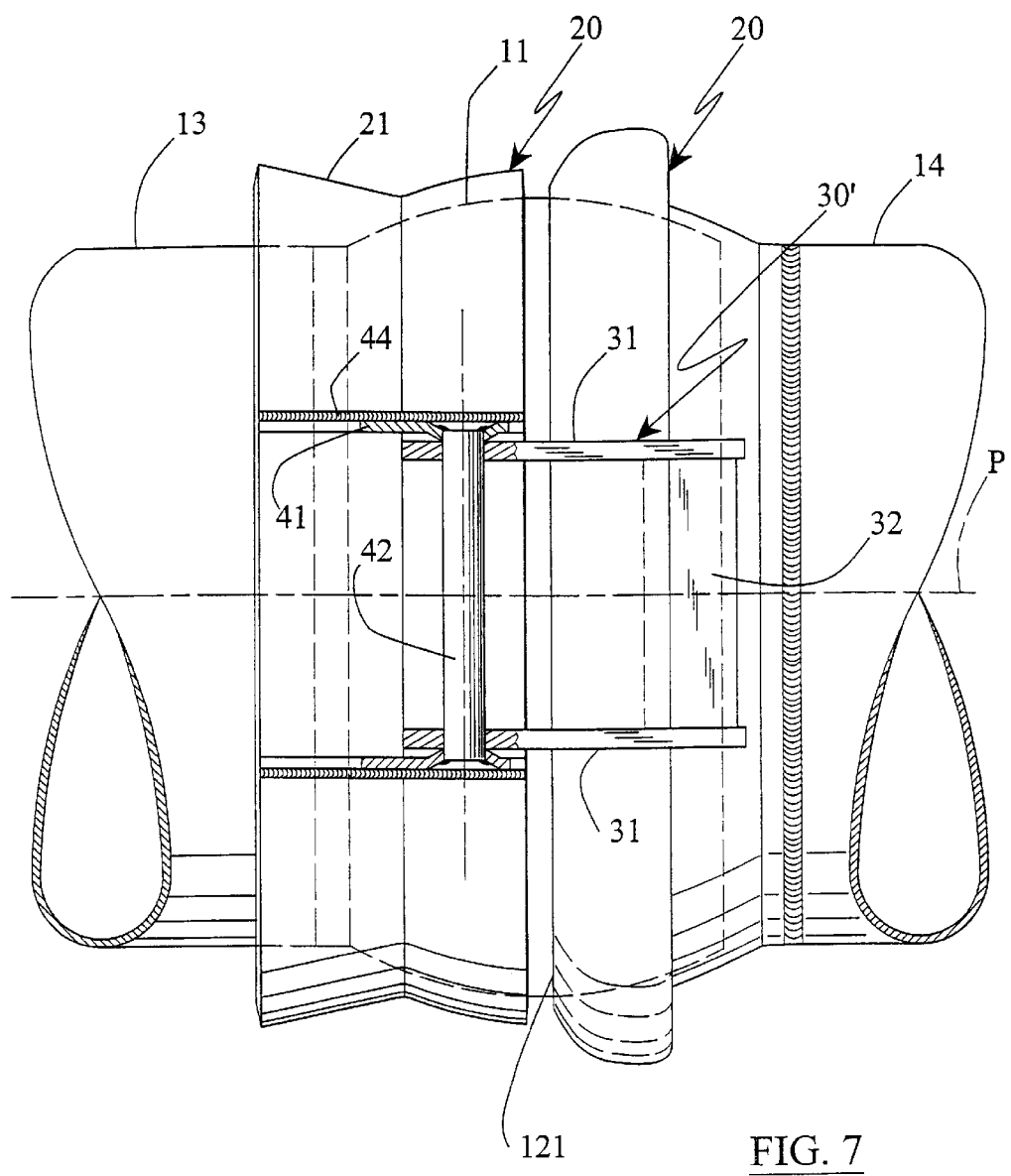
FIG. 7 is a view in the direction of the arrow VII of FIG. 3.
Figure 7A:
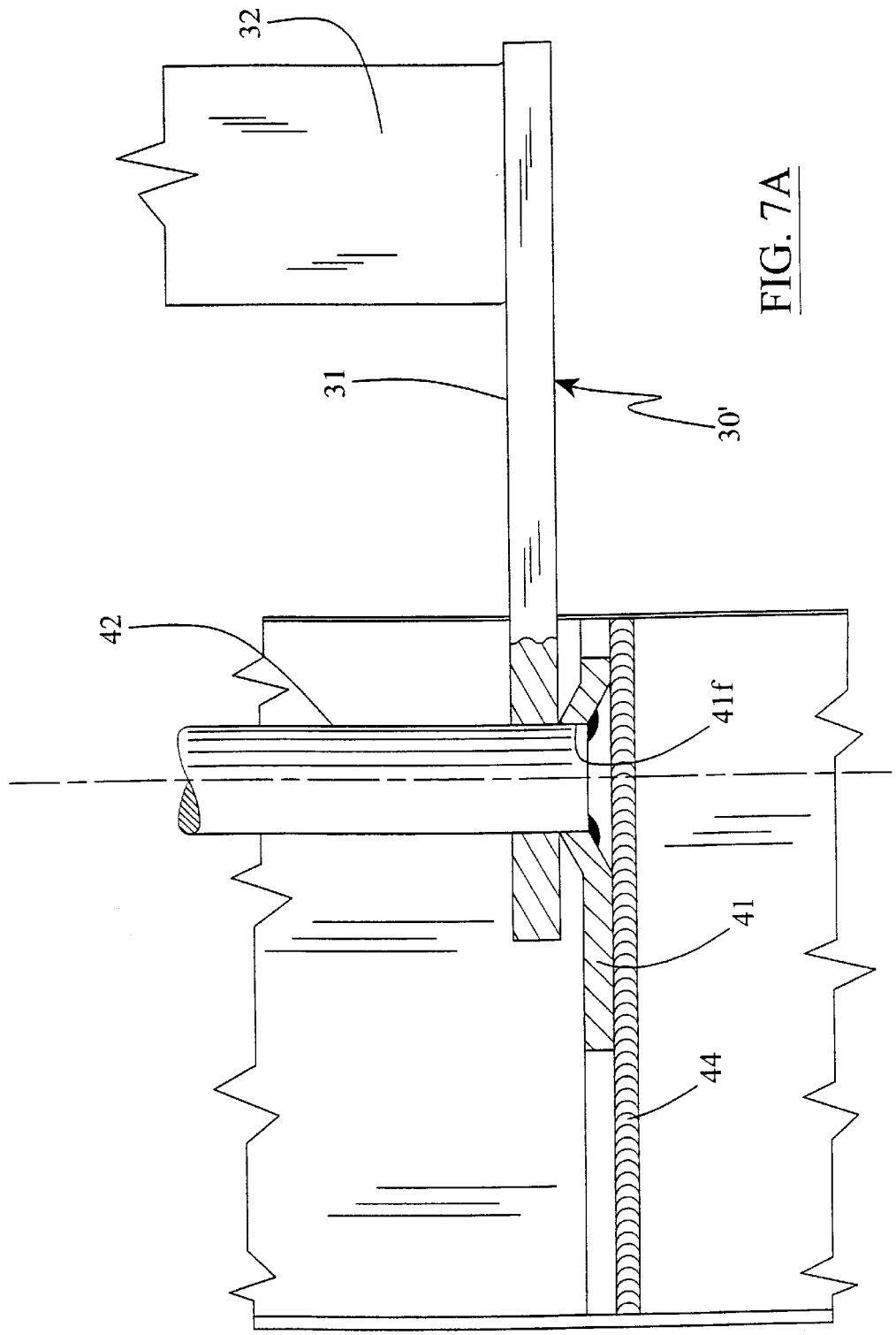
FIG. 7A is an enlarged detail of FIG. 7.

According to an advantageous characteristic, shown in FIGS. 7 and 7A, in the case in which the coupling means 30' is without the lever means 33, the annular portions of the flange 41 which surround the hole 41f into which the transverse pin 42 is inserted project slightly in a transverse direction so that they project transversely inwards to make contact with the outer face of the hooking arms 31, the hooking arms 31 being positioned a small distance from the flange 41 and being in contact with these only at said annular portions.

Figure 6:
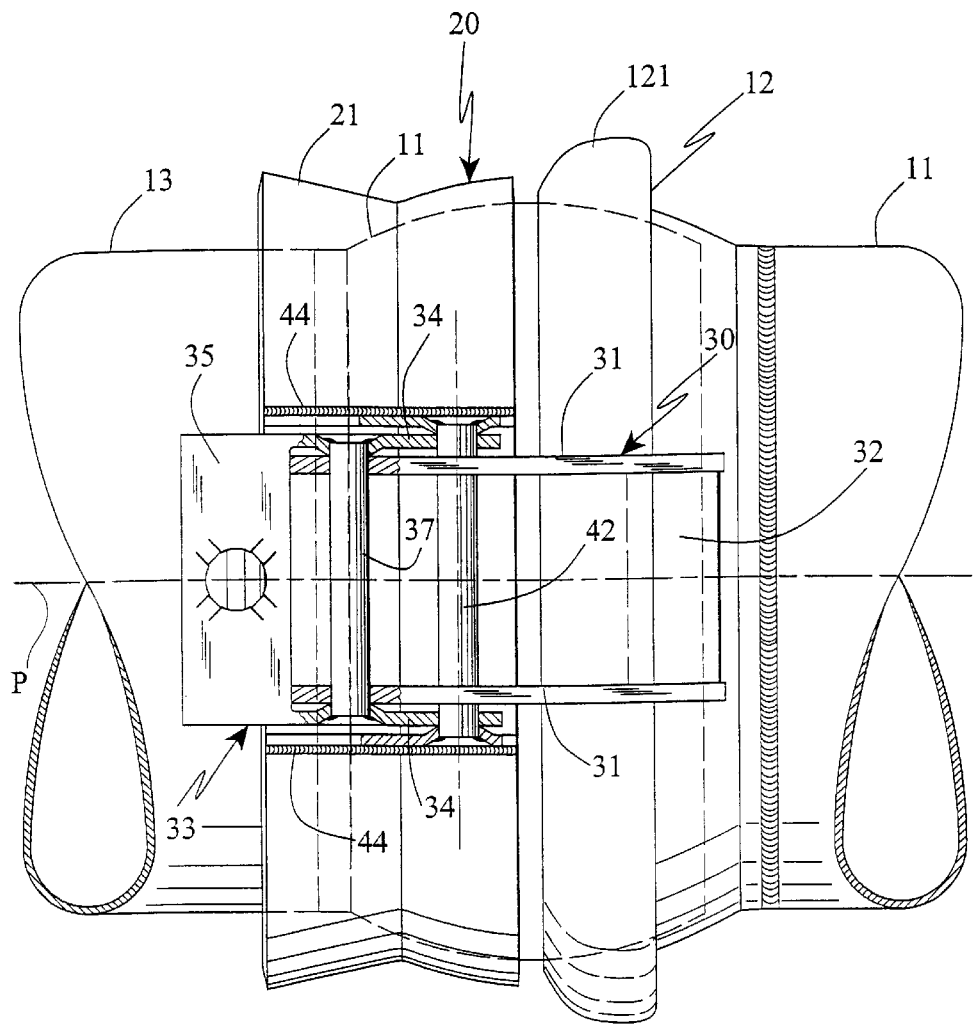
FIG. 6 is a view in the direction of the arrow VI of FIG. 3.

Likewise, in the case in which the coupling means 30 possesses the lever means 33 (see FIGS. 6 and 6A), said annular portions of the flange 41 project slightly in a transverse direction so that they project transversely inwards to make contact with the outer face of the lever arms 34, these being positioned a small distance from the flange 41 and being in contact with these only at said annular portions.

Moreover, again in the case in which the coupling means 30 possesses the lever means 33, the annular portions of the lever arm 34 which surround the hole 34f in which the second transverse pin 37 is fixed project slightly in a transverse direction so that they project transversely inwards to make contact with the outer face of the coupling arms 31, these being positioned a small distance from the lever arms 34 and being in contact with these only at said annular portions.

These characteristics enable the elements of the third component to also be zinc plated on their mutually facing faces, and at the same time reduce to the minimum possible value the flexural stresses produced in the transverse pins 37 and 42.

Numerous modifications of a practical and applicational nature can be made to the invention, but without deviating from the scope of the inventive idea as claimed below.

What is claimed is:

1. A quick coupling ball-and-socket joint for pipes, comprising:
   two components to be coupled together, namely a male component and a female component joined to respective pipes; and,
   for coupling the first two components together, a third component comprising:
      an annular element (21) which embraces the male component and engages it in a transverse plane,
      at least one coupling means (30) for hooking the female component, said coupling means comprising two parallel hooking arms (31) in the form of plates which lie in planes parallel to an axial plane (P) passing through the longitudinal centre line of the coupling means, the two parallel hooking arms connected together by a transverse bar (32) fixed respectively at opposite ends of the transverse bar to the hooking arms, (30),
      a pair of flanges (41) for said coupling means (30) in the form of plates firmly joined to the annular element (21) and lying in planes parallel to the planes defined by the hooking arms (31), said pair carrying a transverse pin (42) for securing the hooking arms (31) in an axial direction,
   said hooking arms (31) being hinged directly and solely in the transverse pin (42) carried by the flanges (41),
   means for applying axial traction to the coupling means (30) in order to firmly join the male and female components together,
   wherein said flanges (41) are applied on the outside of the outer faces of the hooking arms (31).

2. A joint as claimed in claim 1, wherein said arms (31) are positioned directly facing the inner face of the flanges (41).

3. A quick coupling ball-and-socket joint for pipes, comprising:
   two components to be coupled together, namely a male component and a female component joined to respective pipes; and,
   for coupling the first two components together, a third component comprising:
      an annular element (21) which embraces the male component and engages it in a transverse plane, at least one coupling means (30) for hooking the female component, comprising two parallel hooking arms (31) in the form of plates which lie in planes parallel to an axial plane (P) passing through the longitudinal centre line of the coupling means (30), a pair of flanges (41) for each coupling means (30) in the form of plates firmly joined to the annular element (21) and lying in planes parallel to the planes defined by the hooking arms (31), said pair carrying a transverse pin (42) for securing the hooking arms (31) in an axial direction, wherein said flanges (41) are applied on the outside of the outer faces of the hooking arms (31), and traction-applying means (33) for applying axial traction to the coupling means (30) in order to firmly join the male and female components together, said traction-applying means (33) comprising at least one lever means acting on a coupling means (30) in order to move the coupling means (30) in an axial direction, and comprising a pair of lever arms (34) in the form of plates lying in planes parallel to the planes of the flanges (41), wherein said lever arms (34) are interposed between the corresponding hooking arms (31) and the flanges (41).

4. A joint as claimed in claim 3, characterised in that said mutually facing lever arms (34), hooking arms (31) and flanges (41) are disposed in mutual contact.

5. A joint as claimed in claim 3, the pair of lever arms (34) being hinged on said transverse pin (42), characterised in that the annular flange portions (41) which surround a hole (41f) into which the transverse pin (42) is inserted project slightly in a transverse direction in order to project transversely inwards, the hooking arms (31) or the lever arms (34) being positioned slightly distant from the flanges (41) and being in contact therewith only at said annular portions.

6. A joint as claimed in claim 3, the pair of lever arms carrying a second transverse pin (37) on which the hooking arms (31) of the coupling means (30) are hinged, characterised in that the annular portions of the lever arm (34) which surround a hole (34f) in which the second transverse pin (37) is fixed project slightly in a transverse direction in such a manner as to project transversely inwards, the hooking arms (31) being positioned slightly distant from the lever arms (34) and being in contact therewith only at said annular portions.

* * * * *